United States Patent [19]

Abe et al.

[11] Patent Number: 5,451,464

[45] Date of Patent: Sep. 19, 1995

[54] MAGNETIC RECORDING MEDIUM HAVING A MAGNETIC LAYER COMPRISING FERROMAGNETIC POWDERS AND BINDER WHICH IS TWO POLYURETHANE RESINS WITH SPECIFIED GLASS TRANSITION TEMPERATURES

[75] Inventors: Shinji Abe; Yutaka Nakashima; Eiji Horigome; Toshikazu Yahata, all of Nagano, Japan

[73] Assignee: TDK Corporation, Tokyo, Japan

[21] Appl. No.: 248,213

[22] Filed: May 24, 1994

[30] Foreign Application Priority Data

May 24, 1993 [JP] Japan .................................. 5-144260

[51] Int. Cl.⁶ .................................................. G11B 5/00
[52] U.S. Cl. ............................. 428/425.9; 428/694 BU; 428/694 BG; 428/900
[58] Field of Search ...... 428/425.9, 694 BU, 694 BG, 428/900

[56] References Cited

U.S. PATENT DOCUMENTS

| | | | |
|---|---|---|---|
| 4,525,424 | 6/1985 | Bradshaw | 428/425.9 |
| 4,784,907 | 11/1988 | Matsufuji et al. | 428/328 |
| 5,153,079 | 10/1992 | Sasaki et al. | 428/694 |

FOREIGN PATENT DOCUMENTS

| | | |
|---|---|---|
| 59-79428 | 5/1984 | Japan . |
| 64-89020 | 4/1989 | Japan . |
| 9105319 | 4/1989 | Japan . |
| 1-118213 | 5/1989 | Japan . |
| 5-307734 | 11/1993 | Japan . |

*Primary Examiner*—Stevan A. Resan
*Attorney, Agent, or Firm*—Oblon, Spivak, McClelland, Maier & Neustadt

[57] ABSTRACT

A non-magnetic base film is provided thereon with a magnetic layer having ferromagnetic powders dispersed in a binder. The binder contains 30 to 70% by weight of a polyurethane resin A having a glass transition temperature Tg conforming to 60° C.$\leq$Tg$\leq$80° C., and 30 to 70% by weight of a polyurethane resin B having a glass transition temperature Tg conforming to 0° C.$<$Tg$\leq$30° C. The polyurethane resins A and B, at least one which contains a polar group, account for 80 to 100% by weight of the binder. The magnetic recording medium can be fabricated with an improved processability to calendering, has excellent electromagnetic characteristics, allows detachment of powders from the edge portions in particular to be substantially avoided at normal temperature, and is improved in terms of running stability in a high-temperature environment.

3 Claims, 1 Drawing Sheet

MAGNETIC RECORDING MEDIUM HAVING A MAGNETIC LAYER COMPRISING FERROMAGNETIC POWDERS AND BINDER WHICH IS TWO POLYURETHANE RESINS WITH SPECIFIED GLASS TRANSITION TEMPERATURES

BACKGROUND OF THE INVENTION

1. Technical Field

The present invention relates to a magnetic recording medium such as magnetic tape.

2. Background Technique

A problem with a coated type of magnetic recording medium including a magnetic layer having ferromagnetic powders dispersed in a binder is that the constituents forming the magnetic layer such as ferromagnetic powders come off during repeated running.

As recording density increases, it is required to increase recording frequency and, hence, to place the gap between the magnetic layer and a magnetic head under precise control. So far, attention has been paid only to detachment of powders from the overall surface of the magnetic layer in sliding contact with a magnetic head. However, it has now been found that even a slight amount of powders coming off the edges of tape has an adverse influence on the gap between the magnetic recording tape and the associated magnetic head. For instance, this makes an error rate likely to increase in recording digital signals on digital compact cassette (DCC) or other tape, and so offers a problem in view of practical use. There is thus a strong demand for the development of a magnetic recording medium which makes powders more unlikely to come off than ever before.

Various proposals have so far been made to prevent powders from coming off. For instance, JP-A 1-118213 proposes to incorporate in a binder used for a magnetic layer polyurethane resin having a glass transition temperature Tg of up to 0° C. in combination with polyurethane resin having Tg of 50° C. or higher and containing a polar group in its molecule. By the combined use of the soft polyurethane resin having Tg of up to 0° C. and the resin having Tg of 50° C. or higher and containing a polar group it is possible not only to allow magnetic powders, etc., to be dispersed in the magnetic layer with high dispersibility, but also to ensure good processability on calendering equipment (or good susceptibility to calendering), so that abrasion loss of the head, detachment of powders from the overall surface of the magnetic layer, etc., can be reduced. Even when the binder having such composition as set forth in the above publication is used, however, much difficulty is involved in preventing detachment of powders from the edges of tape to be referred to hereinafter. In this connection, it is to be understood that the results of studies made by the inventors teach that the use of resin having Tg of 50° C. or higher and containing a polar group, especially, polyurethane resin makes it possible not only to prevent detachment of powders from the overall surface of the magnetic layer set forth in the above publication, but also to avoid detachment of powders from the edges of tape. When the above polyurethane resin having Tg of 50° C. or higher and containing a polar group is used according to the above publication, however, there is a drop of running stability in a high-temperature environment, which in turn results in unavoidable inconvenience.

This also holds for JP-A 5-307734 precedent to this application, wherein polyester polyurethane resin of 69° C. and 76° C. is used in combination with polyester polyurethane resin of −27° C. and −25° C.

DISCLOSURE OF THE INVENTION

An object of the invention is to provide a magnetic recording medium which makes powders most unlikely to come off at normal temperature, is excellent in running stability in a high-temperature environment in particular, can be fabricated with an improved susceptibility to calendering, and has improved electromagnetic characteristics.

Such an object is achieved by the following inventions (1) to (3).

(1) A magnetic recording medium including on a non-magnetic base film a magnetic recording layer having ferromagnetic powders dispersed in a binder, wherein:

said binder contains 30 to 70% by weight of a polyurethane resin A having a glass transition temperature Tg conforming to 60° C.$\leq$Tg$\leq$80° C. and 30 to 70% by weight of a polyurethane resin B having a glass transition temperature Tg conforming to 0° C.$<$Tg$\leq$30° C., and said polyurethane resin A and said polyurethane resin B account for 80 to 100% by weight of said binder.

(2) A magnetic recording medium as recited in the above (1), wherein said polyurethane resin A and/or said polyurethane resin B contain a polar group.

(3) A magnetic recording medium as recited in the above (1) or (2), wherein a difference in Tg between said polyurethane resin A and said polyurethane resin B is 40° to 70° C.

ACTION AND EFFECT

In the invention, the polyurethane resin A having a glass transition temperature Tg given by 60° C.$\leq$Tg$\leq$80° C. accounts for 30 to 70% by weight of the binder used, and the polyurethane resin B with Tg given by 0° C.$<$Tg$\leq$30° C. accounts for 30 to 70% by weight of the binder used. In addition, the polyurethane resins A and B account for 80 to 100% by weight of the binder. Preferably, the polyurethane resins A and/or B contain a polar group in their molecules.

By containing the polyurethane resin A the magnetic recording medium is improved in terms of running stability in a high-temperature environment, and by containing the polyurethane resin B the magnetic recording medium can be fabricated with an improved susceptibility to calendering and so improved in terms of electromagnetic characteristics without giving rise to a drop of running stability in a high-temperature environment in particular. By allowing these polyurethane resins to contain a polar group, the dispersibility of ferromagnetic powders and the like is much improved.

The incorporation of more than 80% by weight of two such polyurethane resins in the binder has a great effect on preventing detachment of powders from the edges of tape. Such detachment of powders from the edges of tape occurs under conditions much severer than those under which detachment of powders from the overall surface of a magnetic layer occurs due primarily to the sliding contact of the magnetic layer with a magnetic head or guide pins, as referred to in JP-A 1-118213 mentioned above, or the like.

In the case of DCC tape for instance, recording density increases due to the digitization of recording signals, and so the number of recording tracks must be increased by making track width narrow; it is required to place a widthwise displacement of tape under strict control. This widthwise displacement of tape during running is compensated for by the sides of a guide in the vicinity of a magnetic head. In some cases, the edges of tape come in local sliding contact with the sides of the guide, and this gives rise to not only detachment of powders from the overall surface of the magnetic layer but also detachment of a slight amount of powders from the edges of tape, which has not so far attracted attention in the art whatsoever. Now it is thus required to prevent detachment of such a slight amount of powders. Very high stress is applied on the edges of tape due to the sliding contact of the sides of the guide with the edges of tape; it is very difficult to prevent detachment of a slight amount of powders from the edges of tape. To prevent detachment of a slight amount of powders from the edges of tape, the binder containing more than 80% by weight of both the polyurethane resins mentioned above is used in the invention.

However, a grave problem associated with the use of a binder containing about 30 to 50% by weight of polyurethane resin with Tg of 0° C. or lower, as stated in the above publication, is that the binder is apt to soften even at some elevated temperature in an ordinary environment. Consequently, much friction is caused between the magnetic layer and the magnetic head, guide pin or the like, making the running stability of tape to become very worse.

According to the invention, the polyurethane resin B with Tg lying in the range mentioned above, together with the polyurethane resin A, is used in place of such polyurethane resin with Tg of 0° C. or less, so that a magnetic recording medium can be obtained, which is improved in terms of running stability in a high-temperature environment, is greatly effective for preventing detachment of powders from the edge portions, can be fabricated with an improved susceptibility to calendering, and has excellent electromagnetic characteristics.

ILLUSTRATIVE CONSTRUCTION

Figure 1:
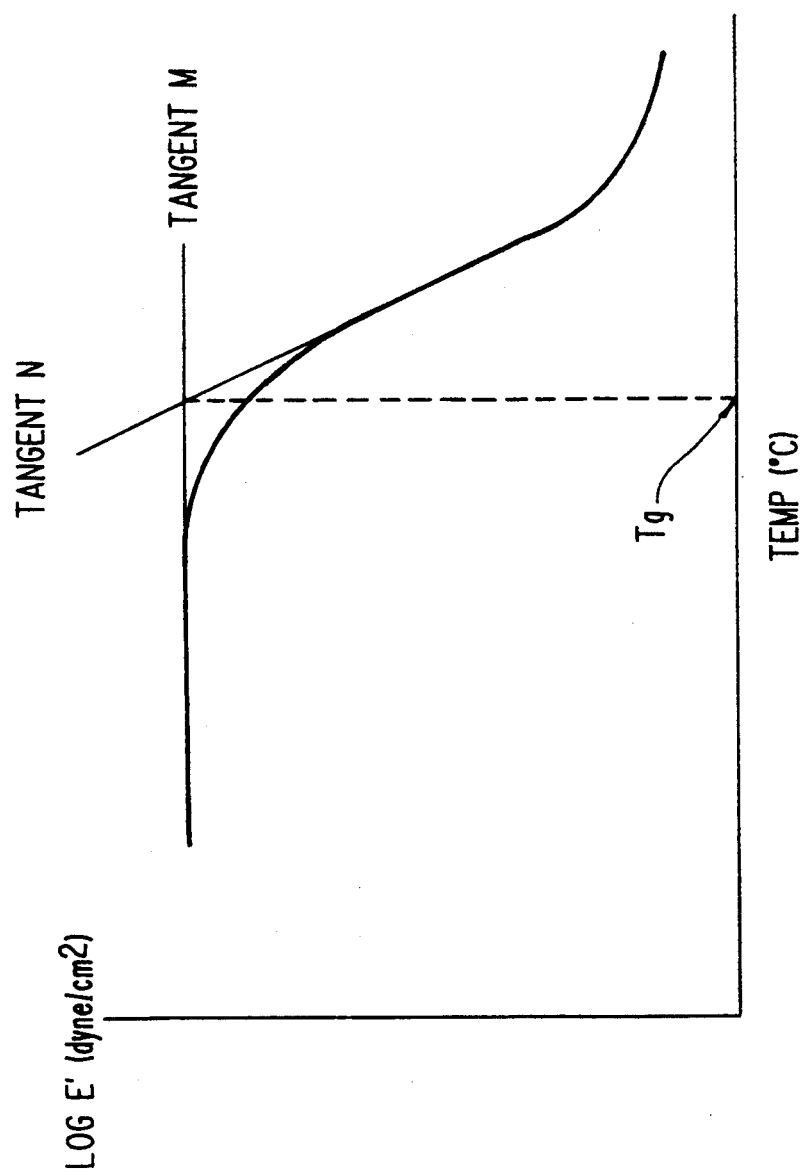
FIG. 1 is a graph showing one example of tangents M and N for finding the point of flexion.

Illustrative constructions of the invention will now be explained at great length.

According to the magnetic recording medium of the invention, the polyurethane resin A having a glass transition temperature Tg given by 60° C.$\leq$Tg$\leq$80° C., preferably 70° C.$\leq$Tg $\leq$80° C. accounts for 30 to 70% by weight, preferably 30 to 50% by weight of the binder.

The polyurethane resin A having too low Tg makes the running stability of the magnetic recording medium likely to become worse in a high-temperature environment, leading to some fault. The polyurethane resin A, when having too high Tg, is not only likely to become poor in solubility in solvents and so dispersibility, but is also likely to give rise to a drop of susceptibility to calendering, resulting in a lowering of the electromagnetic characteristics of the magnetic layer.

When the binder contains too little polyurethane resin A, the running stability of the magnetic recording medium is prone to become worse, leading to some fault. Too much, on the other hand, makes susceptibility to calendering prone to become worse, resulting in not only a lowering of the electromagnetic characteristics of the magnetic layer but a slender action on preventing detachment of powders as well.

Preferably, the polyurethane resin A used has a number-average molecular weight of 5,000 to 60,000, particularly 20,000 to 40,000. When the number-average molecular weight is too low, the interfacial bond strength between the magnetic layer and the non-magnetic base film drops, thus making the magnetic layer apt to peel off or come off. When it is too high, on the other hand, the polyurethane resin A becomes poor in dispersibility, thus making the electromagnetic characteristics of the magnetic layer apt to drop.

The polyurethane resin B having Tg given by 0° C.$<$Tg$\leq$30° C., preferably 3° C.$\leq$Tg$\leq$25° C., and more preferably 5° C.$\leq$Tg $\leq$20° C. accounts for 30 to 70% by weight, preferably 50 to 70% by weight of the binder.

The polyurethane resin B having too low Tg makes the running stability of the magnetic recording medium likely to become worse in a high-temperature environment in particular, leading to some fault. The polyurethane resin B, when having too high Tg, gives rise to a lowering of susceptibility to calendering, rendering the surface of the magnetic layer coarse and, hence, resulting in a drop of the electromagnetic characteristics such as output.

Too little polyurethane resin B incurs a drop of susceptibility to calendering, so making the electromagnetic characteristics of the magnetic layer apt to drop. Too much, on the other hand, makes the running stability of the magnetic recording medium to become worse in a high-temperature environment.

Preferably, the polyurethane resin B used has a number-average molecular weight of 5,000 to 60,000, particularly 20,000 to 40,000. When the number-average molecular weight is too low, the interfacial bond strength between the magnetic layer and non-magnetic base film drops, so making the magnetic layer apt to peel off or come off. When it is too high, on the other hand, the polyurethane resin B becomes poor in dispersibility, so making the electromagnetic characteristics of the magnetic layer likely to drop.

Preferably, the difference in Tg between the polyurethane resins A and B is 40° to 70° C. When such a difference departs largely from this range, a problem of detachment of powders arises with a drop of the running stability of the magnetic recording medium. It is understood that the glass transition temperature Tg may be determined, using the dynamic viscoelasticity meter to be referred to hereinafter.

The total amount of the polyurethane resins A and B is preferably 80 to 100% by weight, particularly 95 to 100% by weight of the resin used. When the total amount of the polyurethane resins A and B is too small, detachment of powders from the edges of tape occurs, making the error rate likely to increase, the running stability of the magnetic recording medium apt to become worse in a high-temperature environment, or susceptibility to calendering prone to drop, so rendering the surface of the magnetic layer coarse and the electromagnetic characteristics such as output likely to deteriorate.

Any desired polyurethane resin usually available for such magnetic recording media may be used as the polyurethane resins A and B, with the proviso that they have the glass transition temperature Tg mentioned above. To improve the dispersibility of powders contained in the magnetic layer such as ferromagnetic powders and the running durability of the magnetic layer, however, it is preferable that the polyurethane resins A and/or B have a polar group in their molecules.

Preferably, the polyurethane resins A and B contain at least one polar group, e.g. a sulfur-containing group such as slufonic acid, sulfuric acid, or their ester or salt; a phosphorus-containing group such as phosphonic acid, phosphinic acid, phosphoric acid, or their ester or salt; or a carboxylic acid or its salt. Particularly preferable are a sulfonic acid group ($-SO_3Y$), a carboxylic acid group ($-COOY$), and a phosphonic acid group ($-PO_3Y$), wherein Y may be either H or an alkali metal. Preferably, about 0.1 to 5 such polar groups, calculated as molecule, are contained per molecule of the polyurethane polymer.

The binder used for the magnetic recording medium of the invention may additionally contain up to 20% by weight of resins other than the polyurethane resins A and B mentioned above. Reliance may be on ordinarily used resins. For instance, use may be made of polyurethane resin with Tg departing from the range mentioned above, vinyl chloride-acrylic ester copolymers, vinyl chloride-vinyl acetate copolymers, vinyl chloride-vinylidene chloride copolymers, vinyl chloride-acrylonitrile copolymers, acrylic ester-acrylonitrile copolymers, acrylic ester-vinylidene chloride copolymers, methacrylic ester-vinylidene chloride copolymers, methacrylic ester-ethylene copolymers, polyvinyl fluoride-vinylidene chloride-acrylonitrile copolymers, acrylonitrile-butadiene copolymers, polyamide resin, polyvinyl butyral, cellulose derivatives (e.g., cellulose acetate butyrate, cellulose diacetate, cellulose triacetate, cellulose propionate, and nitrocellulose), styrene-butadiene copolymers, polyester resin-chlorovinylether acrylate copolymer, amino resin, and a synthetic rubber type of thermoplastic resin. Of these resins, particular preference is given to polyurethane resin to enhance the action on preventing detachment of powders from the edges of tape. These may be used alone or in combination of two or more.

Preferably, the magnetic layer contains the binder in an amount of 5 to 30 parts by weight, particularly 15 to 25 parts by weight per 100 parts by weight of ferromagnetic powders. At too low a content the binder decreases the strength of the magnetic layer, and so makes the running durability of the magnetic layer likely to become worse. Too much, on the other hand, lowers the electromagnetic characteristics of the magnetic layer due to a decrease in the content of ferromagnetic powders.

For a cross-linking agent for the binder resins it is preferable to use various polyisocyanates, particularly diisocyanates. It is more preferable to use tolylene diisocyanate and/or hexamethylene diisocyanate and/or methylene diisocyanate. Most preferably, these cross-linking agents are used in the form of a cross-linking agent modified into trimethylolpropane or analogues having a plurality of hydroxyl groups or an isocyanurate type cross-linking agent in which three molecules of the isocyanate compound are bound to one another. The cross-linking agent is bound to the functional groups, etc., contained in the binder resins for cross-linking the resins together. The content of the cross-linking agent is preferably 10 to 30 parts by weight per 100 parts by weight of the binder.

For the ferromagnetic powders used for the magnetic recording medium according to the invention, suitable powders may be chosen out of fine oxide powders such as those of $\gamma$-$Fe_2O_3$, Co-containing $\gamma$-$Fe_2O_3$, $Fe_3O_4$, Co-containing $Fe_3O_4$, and $CrO_2$, and known magnetic powders such as those of Fe, Co, Ni, or their alloys, depending on the purpose; no particular limitation is placed thereon.

The ferromagnetic powders may take usually available acicular, spindle, particulate, sheet or all other available forms. However, the acicular or spindle form is preferable to the particulate or sheet form for the reasons that the effect of orientation in a magnetic field is expected to be enhanced, the longitudinal strength of the magnetic layer itself is intensified, and so on. No particular limitation is imposed on other factors of such a form of powders, e.g., mean major diameter, and mean axial ratio. However, it is preferable that the mean major diameter and mean axial ratio are about 0.1–5 $\mu$m and about 3–15, respectively, although they vary depending on the construction of the end magnetic layer.

Moreover, the coercive force Hc, saturation magnetization $\sigma$s and other factors of the ferromagnetic powders are not critical; they may be selected depending on the purpose. However, it is usually preferable that Hc and $\sigma$s are within the ranges of about 350–2,000 Oe and about 50–150 emu/g, respectively.

Such ferromagnetic powders may account for about 70 to 90 parts by weight of the magnetic layer composition. Too much ferromagnetic powders make it difficult to achieve surface smoothness by calendering due to a decrease in the content of the binder, whereas too little makes it impossible to obtain high output.

To enhance the mechanical strength of the magnetic layer, it is preferable that the magnetic layer further contains inorganic fine particles such as those of $\alpha$-$Al_2O_3$, $Cr_2O_3$, $TiO_2$, SiC, and $\alpha$-$Fe_2O_3$. If required, the magnetic layer may contain dispersants such as phosphoric ester and fatty acids, lubricants such as fatty acid esters and silicone oil, and other additives.

A magnetic coating material may be prepared by adding an organic solvent to the components of such a magnetic layer composition. The organic solvents used are not critical; various organic solvents usually used for magnetic recording media, e.g., ketones such as cyclohexanone, methyl ethyl ketone, methyl isobutyl ketone, and isophorone, aromatic solvents such as toluene, and furan solvents such as THF may be used alone or in combination of two or more depending on the purpose. The content of the organic solvent in the magnetic coating material, too, is not critical; it may be determined depending on the composition of the magnetic coating material, how to prepare it, how to coat it, and so on.

The prepared magnetic coating material is coated on the non-magnetic base film which is not critical, and so may have tape or other forms of given size according to various standards, which may be fabricated from various flexible materials or various rigid materials depending on the purpose. For instance, polyesters such as polyethylene terephthalate and polyethylene naphthalate, polyamides and other various resins may be mentioned as the flexible materials.

No particular limitation is imposed on how to coat the magnetic coating material; it may be coated on the non-magnetic base film by any one of conventional procedures which, too, may be selected depending on the purpose. The magnetic layer may be either of a single layer structure or of a multi-layer structure. Moreover, a primer coat layer may be provided between the magnetic layer and the non-magnetic base film to improve the adhesion between them, or a non-magnetic layer or the like may be provided between the magnetic layer and the non-magnetic base film or the primer coat layer to improve susceptibility to calendering. These may be selected depending on the performance of the magnetic recording medium, the purpose, and other considerations. It is noted that when a magnetic recording layer of a multi-layer structure is used or an additional non-magnetic layer is provided, it is preferable to incorporate the above ranges of the polyurethane resins A and B in the binders of all the layers having them, thereby preventing detachment of powders.

The magnetic recording medium of the invention is fabricated through the steps of orientation, drying, calendering, curing and other processing after the application of the coating material. These steps are not critical; conventional steps may be used selectively depending on the purpose. The thus obtained magnetic layer, if it is of a single structure, may have a thickness of usually about 0.3 to 6 μm.

To improve the running stability of the magnetic recording layer and protect the magnetic layer against electrification, and for other purposes, it is preferable according to the invention to provide a back coat layer. The back coat layer may be provided in conventional manners.

EXAMPLES

The invention will now be explained at great length by reference to the following illustrative examples.

A DCC magnetic tape having a magnetic layer and a back coat layer was fabricated in the following manner. Unless otherwise stated, the magnetic and back coat layer compositions are given in parts by weight.

| - Magnetic Layer - | |
|---|---|
| Co-deposited γ-$Fe_2O_3$ (having the BET, Hc and σs values of 40 $m^2/g$, 720 Oe and 75 emu/g) | 100 |
| Binder (with the compositions shown in Tables 1 and 2) | 17 |
| α-alumina (with the particle diameter of 0.2 μm | 1.5 |
| Myristic acid | 0.5 |
| Polyisocyanate | 5 |
| Methyl ethyl ketone | 290 |
| Cyclohexanone | 90 |

Magnetic coating materials composed of the above components including the binders with the compositions shown in Tables 1 and 2 were prepared. Each coating material was coated on a 10-μm thick non-magnetic base film of polyester, oriented in a magnetic field, dried, and calendered to form a 2-μm thick magnetic layer, which was then heated at 60° C. for 24 hours. It is here noted that the polyurethane resin contained a sulfonic acid group. In Tables 1 and 2 the percentage composition of the binder is given in % by weight.

The back coat layer composed of the following components was then formed on the back side of the magnetic layer on the non-magnetic base film.

| - Back Coat Layer - | |
|---|---|
| Carbon black (with the mean particle diameter of 0.03 μm) | 97 |
| Non-magnetic powders ($SiO_2$ powders having the mean carticle of 60 μm) | 3 |
| Vinyl chloride-vinyl acetate-vinyl alcohol copolymer | 70 |
| Polyurethane | 30 |
| Silicone oil | 2 |
| Polyisocyanate | 30 |
| Methyl ethyl ketone | 840 |
| Toluene | 560 |

A coating material for the back coat layer composed of the above components was coated, dried, calendered, and heated at 60° C. for 24 hours to form a 0.5-μm thick layer.

The obtained magnetic recording media were estimated. Set out below are how to measure the Tg of the polyurethane resins, and how to make estimation of each of the obtained magnetic recording medium samples.

Measurement of Tg

Using a dynamic viscoelasticity meter "Viscoelasticity Spectrometer Type VES-F-III", Iwamoto Seisakusho K.K., Tg was measured under the following conditions:

Continuous application of sine-wave strain of 100 Hz frequency

Amplitude: 20 μm

Heating rate: 2° C./min.

Tg was found from the point of flexion on a temperature dependence curve of the value of log E' of the thus obtained dynamic elastic modulus E'. As can be seen from FIG. 1 or a graph showing the temperature dependence curve of the value of log E', the point of flexion is defined as the point of intersection of tangents M and N.

Estimation of Detachment of Powders

Each magnetic recording medium or tape sample was allowed to run repeatedly on a DCC900 tape recorder (Phillips) at 25° C. for 24 hours to make visual estimation of to what degree magnetic powders coming off the edges of the tape were deposited on the tape pad. In Tables 1 and 2 ◯ represents samples with no substantial deposition of powders on the tape pad, Δ samples with a likelihood of the error rate increasing, x samples with noticeable deposition of powders on the tape pad, and xx samples with remarkable deposition of powders on the tape pad.

Estimation of Output

Using a DTT1000 tape recorder (Phillips), a 48-kHz signal was recorded to measure output upon playback. Samples were deemed as unacceptable when the outputs were below the reference output level 0.0 dB of magnetic recording medium sample No. 1 or a conventional medium having a satisfactory output level.

Run Testing At High Temperature

Each magnetic tape was allowed to running repeatedly on a DCC900 tape recorder (Phillips) at 60° C. for 24 hours. In one testing run 30 samples (n=30) were used. Estimation was made in terms of the number of samples that incurred some inconvenience due to an increased torque.

The results of estimation are shown in Tables 1 and 2 together with the type of the binder used, Tg, and percentage composition.

having a thickness of 1.5 μm upon drying and an upper layer containing Co-deposited γ-$Fe_2O_3$ (Hc: 720 Oe and BET: 40 $m^2$/g) and having a thickness of 0.5 μm upon

TABLE 1

| Sample No. | Binder (Tg :°C.) | Percentage composition (%) | Testing for detachment of powders | Run at high temperature Number of snarling-up sample (n=30) | Output (dB) |
|---|---|---|---|---|---|
| 1 (com.) | VCl-VA copolymer * (80) | 50 | × × | 0 | 0.0 |
|  | Polyurethane B1 (20) | 50 |  |  |  |
| 2 (com.) | VCl-VA copolymer * (80) | 50 | × × | 0 | 0.4 |
|  | Polyurethane B2 ( 5) | 50 |  |  |  |
| 3 (com.) | VCl-VA copolymer * (80) | 20 | × | 12 | 0.5 |
|  | Polyurethane B1 (20) | 80 |  |  |  |
| 4 (com.) | Polyurethane A1 (70) | 100 | × | 0 | −1.1 |
| 5 (com.) | Polyurethane C1 (40) | 100 | ○ | 4 | 0.2 |
| 6 (com.) | Polyurethane B1 (20) | 100 | ○ | 26 | 1.2 |
| 7 (com.) | Polyurethane B2 ( 5) | 100 | ○ | 30 | 1.4 |
| 8 (com.) | Polyurethane D1 (−2) | 100 | ○ | 30 | 1.4 |
| 9 (com.) | Polyurethane D2 (−20) | 100 | ○ | 30 | 1.6 |
| 10 (com.) | Polyurethane A1 (70) | 50 | △ | 0 | −0.6 |
|  | Polyurethane C1 (40) | 50 |  |  |  |
| 11 (com.) | Polyurethane A1 (70) | 50 | ○ | 8 | 0.8 |
|  | Polyurethane D1 (−2) | 50 |  |  |  |
| 12 (com.) | Polyurethane A1 (70) | 50 | ○ | 21 | 0.9 |
|  | Polyurethane D2 (−20) | 50 |  |  |  |
| 13 (com.) | Polyurethane C1 (40) | 50 | ○ | 25 | 1.1 |
|  | Polyurethane B2 ( 5) | 50 |  |  |  |
| 14 (com.) | Polyurethane A1 (70) | 20 | ○ | 13 | 0.7 |
|  | Polyurethane B1 (20) | 80 |  |  |  |
| 15 (com.) | Polyurethane A1 (70) | 80 | △ | 0 | −0.4 |
|  | Polyurethane B1 (20) | 20 |  |  |  |
| 16 (Ex.1) | Polyurethane A1 (70) | 50 | ○ | 0 | 0.3 |
|  | Polyurethane B1 (20) | 50 |  |  |  |
| 17 (Ex.1) | Polyurethane A1 (70) | 50 | ○ | 0 | 0.8 |
|  | Polyurethane B2 ( 5) | 50 |  |  |  |
| 18 (Ex.1) | Polyurethane A1 (70) | 35 | ○ | 0 | 0.6 |
|  | Polyurethane B1 (20) | 65 |  |  |  |
| 19 (Ex.1) | Polyurethane A1 (70) | 35 | ○ | 0 | 0.1 |
|  | Polyurethane B1 (20) | 50 |  |  |  |
|  | Polyurethane C1 (40) | 15 |  |  |  |

* : Vinyl chloride-Vinyl acetate-Vinyl alcohol copolymer

TABLE 2

| Sample No. | Binder (Tg :°C.) | Percentage composition (%) | Testing for detachment of powders | Run at high temperature Number of snarling-up sample (n=30) | Output (dB) |
|---|---|---|---|---|---|
| 20 (Ex.1) | VCl-VA copolymer * (80) | 15 | ○ | 0 | +0.3 |
|  | Polyurethane A1 (70) | 20 |  |  |  |
|  | Polyurethane B1 (20) | 65 |  |  |  |
| 21 (Ex.1) | Polyurethane A2 (60) | 50 | ○ | 0 | +0.3 |
|  | Polyurethane B1 (20) | 50 |  |  |  |
| 22 (Ex.1) | Polyurethane A2 (60) | 50 | ○ | 0 | +0.7 |
|  | Polyurethane B2 ( 5) | 50 |  |  |  |
| 23 (Ex.1) | Polyurethane A3 (75) | 50 | ○ | 0 | +0.1 |
|  | Polyurethane B1 (20) | 50 |  |  |  |
| 24 (Ex.1) | Polyurethane A3 (75) | 50 | ○ | 0 | +0.4 |
|  | Polyurethane B2 ( 5) | 50 |  |  |  |
| 25 (com.) | VCl-VA copolymer * (80) | 25 | △ | 0 | +0.3 |
|  | Polyurethane A1 (70) | 10 |  |  |  |
|  | Polyurethane B1 (20) | 65 |  |  |  |
| 26 (com.) | Polyurethane C2 (55) | 50 | ○ | 3 | +0.7 |
|  | Polyurethane B2 ( 5) | 50 |  |  |  |
| 3 (Ex.2) | Polyurethane A1 (70) | 50 | ○ | 0 | +0.4 |
|  | Polyurethane B1 (20) | 50 |  |  |  |

* : Vinyl chloride-Vinyl acetate-Vinyl alcohol copolymer

As can be seen from Tables 1 and 2, the magnetic tape samples containing the binder in the inventive range are effective for preventing detachment of powders from the surfaces of the magnetic layers and the edge portions, and are much improved in terms of running stability in a high-temperature environment, and output.

EXAMPLE 2

A magnetic recording medium of a double layer structure comprising a lower layer containing Co-deposited γ-$Fe_2O_3$ (Hc: 700 Oe and BET: 28 $m^2$/g) and drying was fabricated according to Example 1. Both the upper and lower layers contained as the binder the polyurethane resins A (Tg=70° C.) and B (Tg=20° C.) at 50:50. The results of this medium or sample No. 31 are also shown in Table 2.

What we claim is:

1. A magnetic recording medium including on a non-magnetic base film a magnetic recording layer having ferromagnetic powders dispersed in a binder, wherein:

said binder contains 30 to 70% by weight of a polyurethane resin A having a glass transition temperature Tg conforming to 60° C.≦Tg≦80° C., and 30 to 70% by weight of a polyurethane resin B having a glass transition temperature Tg conforming to 0° C.<Tg≦30° C., said polyurethane resin A and said polyurethane resin B accounting for 80 to 100% by weight of said binder.

2. A magnetic recording medium as recited in claim 1, wherein said polyurethane resin A and/or said polyurethane resin B contains a polar group.

3. A magnetic recording medium as recited in claim 1 or 2, wherein a difference in Tg between said polyurethane resin A and said polyurethane resin B is 40° to 70° C.

* * * * *